United States Patent
Ito

[11] Patent Number: 5,867,614
[45] Date of Patent: *Feb. 2, 1999

[54] CONTROL FOR AN IMAGE FILING APPARATUS

[75] Inventor: Hirohiko Ito, Kawasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 637,054

[22] Filed: Apr. 24, 1996

[30] Foreign Application Priority Data

Apr. 27, 1995 [JP] Japan .................................. 7-127136

[51] Int. Cl.$^6$ ..................................................... G06K 9/00
[52] U.S. Cl. ........................................... 382/305; 382/232
[58] Field of Search .................................... 382/232, 276, 382/305, 306, 307, 309, 310, 311, 312, 317, 233, 234, 235, 239, 254, 282, 302, 303, 304, 316, 318, 319; 358/444, 426, 538, 461, 500, 453, 524, 521; 345/1, 157

[56] References Cited

U.S. PATENT DOCUMENTS 4,695,966  9/1987  Takakura et al. ....................... 364/521
4,937,662  6/1990  Matsunawa et al. ..................... 358/75
5,058,185  10/1991 Morris et al. .............................. 382/41
5,113,251  5/1992  Ichiyanagi et al. ....................... 358/75
5,122,872  6/1992  Nagano .................................... 358/78
5,267,052  11/1993 Bannai et al. .......................... 358/444

Primary Examiner—Leo H. Boudreau
Assistant Examiner—Bijan Tadayon
Attorney, Agent, or Firm—Fitzpatrick, Cella, Harper & Scinto

[57] ABSTRACT

An image of an original is read and stored into a first buffer memory and encoded. The encoded data is stored into a second buffer memory. The stored encoded data is transferred to, e.g., a magneto-optic disk drive unit. Further, the image data stored in the first buffer memory is converted into the image data of a low resolution and is encoded and stored into a third buffer memory. The stored encoded data is transferred to the magneto-optic disk drive unit. After the image data stored in the first buffer memory is encoded, the resolution conversion of the image data stored in the first buffer memory is started in a manner such that the recording of the encoded data of low resolution to a magneto-optic disk can be started just after the encoded data of high resolution was recorded to the magneto-optic disk. Thus, the image data of high resolution and the image data of low resolution can be promptly recorded onto the magneto-optic disk.

18 Claims, 5 Drawing Sheets

CONTROL FOR AN IMAGE FILING APPARATUS

BACKGROUND OF THE INVENTION

1. Field of the Invention

The invention relates to a control apparatus of an image filing apparatus for storing images into a memory medium.

2. Related Background Art

Hitherto, in the case of storing images into a memory medium, the images are compressed and encoded and stored so that a larger number of images can be stored within a range of a limited memory capacity.

In a compound image processing apparatus to which a filing function is added to a digital copying apparatus, there is a demand for the ability to display an image retrieved from the memory medium onto a large liquid crystal display provided for an operation unit and to confirm the image.

In the liquid crystal display of the operation unit, however, for example, since the number of display pixels is small (for example, 400×200 dots or the like), only a part of the original image can be displayed.

Therefore, when image data of an ordinary high resolution is stored into the memory medium, there is considered a method whereby image data of a low resolution which was reduced to the image suitable for displaying to the liquid crystal display is previously separately formed and stored into the memory medium. In this case, however, if two storing processes are sequentially executed in a manner such that after the image data of the ordinary high resolution was subjected to an encoding process and stored, in order to separately store the image data of the low resolution obtained by reducing the image data of the high resolution, the reducing process and the encoding process are executed and the resultant data is stored, it takes a long time to store the image data into the memory medium.

SUMMARY OF THE INVENTION

It is an object of the invention to provide a method and apparatus for controlling an image filing apparatus, in which the above problems can be solved.

Another object of the invention is to provide a method and apparatus for controlling an image filing apparatus, in which image data of a high resolution and image data of a low resolution obtained by reducing the image data of the high resolution can be stored into a memory medium.

Still another object of the invention is to provide a method and apparatus for controlling an image filing apparatus, in which an encoding process, a storing process, and a reducing process of image data of a high resolution and an encoding process and a storing process of image data of a low resolution can be efficiently performed.

The above and other objects and features of the present invention will become apparent from the following detailed description and the appended claims, taken with reference to the accompanying drawings.

DETAILED DESCRIPTION OF THE PREFERRED EMBODIMENT

Figure 1:
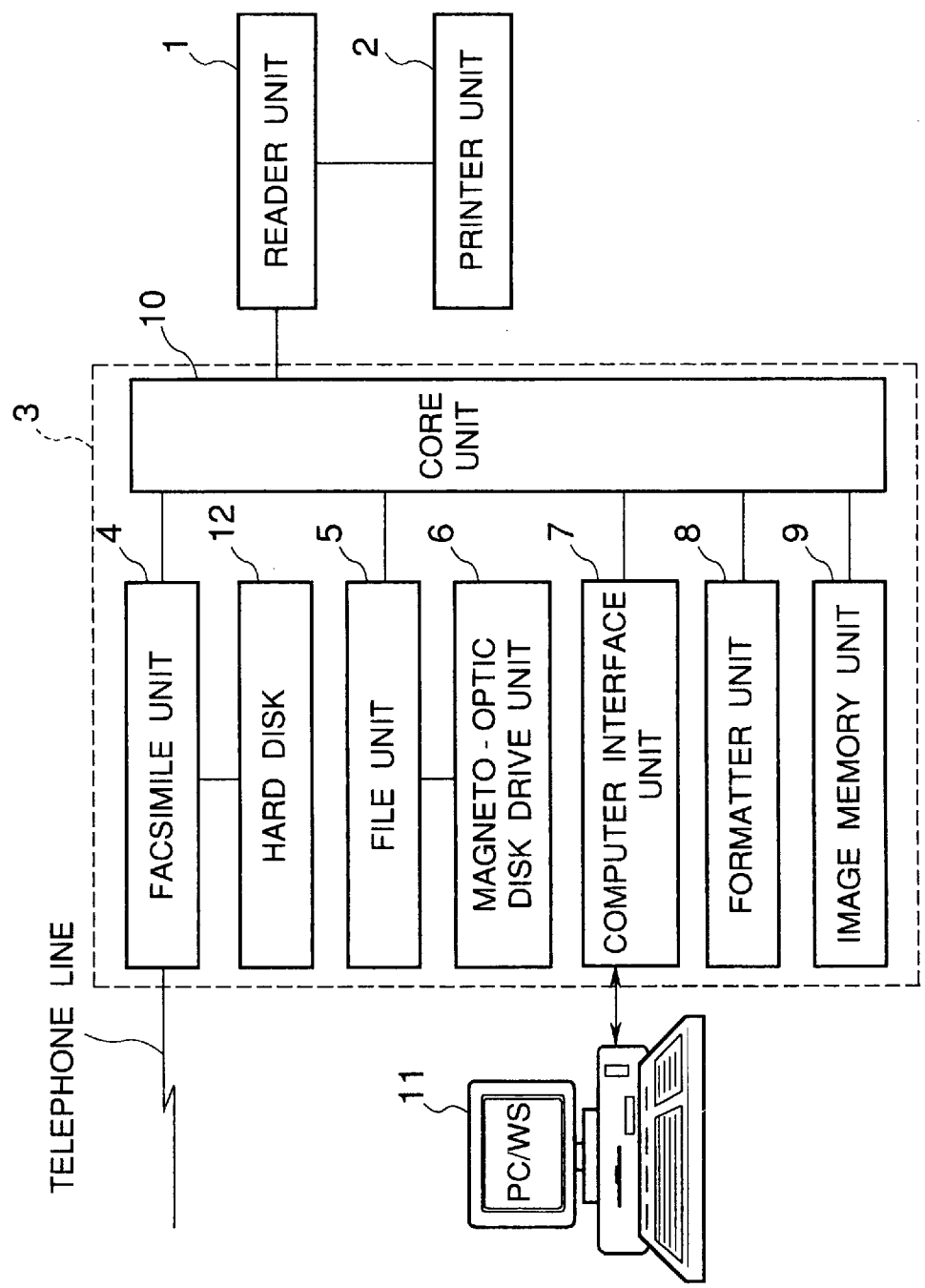
FIG. 1 is a block diagram showing a schematic construction of a compound image processing apparatus to which the invention can be applied.

FIG. 1 is a block diagram showing a construction of an image processing apparatus to which the invention can be applied. A reader unit 1 reads an image of an original and outputs image data corresponding to the original image to a printer unit 2 and an image input/output (I/O) control unit 3. The printer unit 2 records the image corresponding to the image data from the reader unit 1 and image I/O control unit 3 onto a recording paper. The image I/O control unit 3 is connected to the reader unit 1 and is constructed by: a facsimile unit 4; a file unit 5; a computer interface unit 7; a formatter unit 8; an image memory unit 9; a core unit 10; and the like.

The facsimile unit 4 expands the compressed image data which was received through a telephone line, transfers the expanded image data to the core unit 10, compresses the image data transferred from the core unit 10, and transmits the compressed compression image data through the telephone line. A hard disk 12 is connected to the facsimile unit 4 and can temporarily store the received compression image data. A magneto-optic disk drive unit 6 as an external storage device is connected to the file unit 5. The file unit 5 compresses the image data transferred from the core unit 10 and stores the image data onto a magneto-optic disk set in the magneto-optic disk drive unit 6 together with a key word to retrieve the compression image data. The file unit 5 also retrieves the compression image data stored on the magneto-optic disk on the basis of the key word transferred through the core unit 10. The file unit 5 reads out the retrieved compression image data, expands it, and transfers the expanded image data to the core unit 10. The computer interface unit 7 is an interface between a personal computer or workstation (PC/WS) 11 and the core unit 10. The formatter unit 8 develops code data indicative of the image transferred from the PC/WS 11 into the image data which can be recorded by the printer unit 2. The image memory unit 9 temporarily stores the data transferred from the PC/WS 11. Although the core unit 10 will be explained hereinlater, the core unit 10 controls a flow of the data among the reader unit 1, facsimile unit 4, file unit 5, computer interface unit 7, formatter unit 8, and image memory unit 9.

Figure 2:
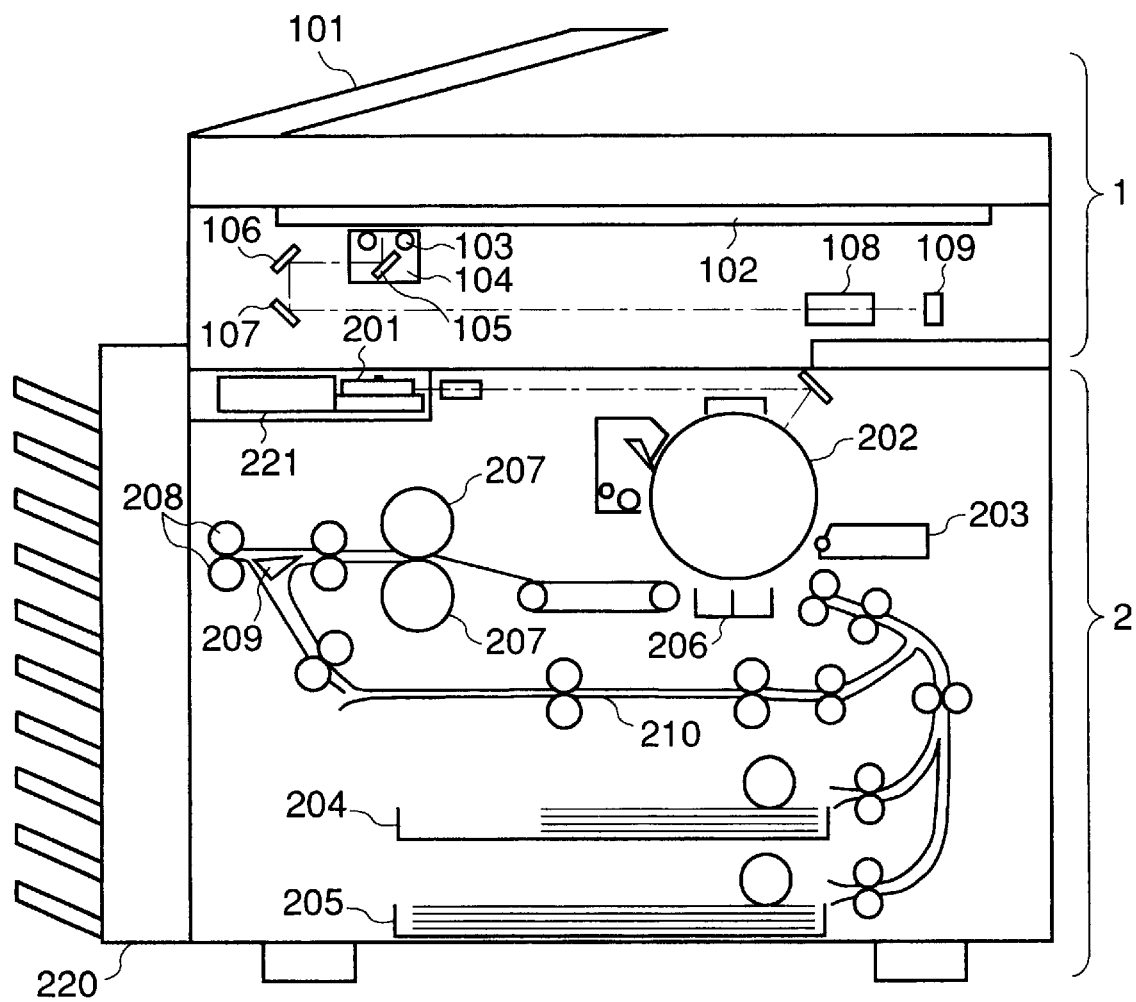
FIG. 2 is a cross-sectional view showing a construction of a reader unit and a printer unit.

FIG. 2 is a cross-sectional view of the reader unit 1 and printer unit 2. A document feeder 101 of the reader unit 1 sequentially feeds originals one by one onto a platen glass 102 from the last page. After completion of the reading of the originals, the document feeder 101 ejects the original on the platen glass 102. When the original is conveyed onto the platen glass 102, a lamp 103 is lit, the movement of a scanner unit 104 is started, and the original is exposed and scanned. A reflected light from the original in this instance is reflected by mirrors 105, 106, and 107 and is guided to a CCD image sensor (hereinafter, referred to as a CCD) 109 through a lens 108. In this manner, the image of the original which was scanned is read by the CCD 109. The image data which is outputted from the CCD 109 is subjected to predetermined processes. After that, the processed data is transferred to the printer unit 2 and the core unit 10 of the image I/O control unit 3.

A laser driver 221 of the printer unit 2 drives a laser light emitting unit 201, thereby allowing the laser light emitting unit 201 to emit a laser beam corresponding to the image data outputted from the reader unit 1. The laser beam is irradiated on to a photosensitive drum 202. A latent image corresponding to the laser beam is formed on the photosensitive drum 202. A developing agent is deposited to the portion of the latent image of the photosensitive drum 202 by a developing device 203. At a timing synchronized with the start of the irradiation of the laser beam, the recording paper is fed from either one of cassettes 204 and 205 and conveyed to a transfer unit 206. The developing agent deposited on the photosensitive drum 202 is transferred to the recording paper. The recording paper on which the developing agent is deposited is conveyed to a fixing unit 207. The developing agent is fixed on the recording paper by heat and pressure of the fixing unit 207. The recording paper which passed through the fixing unit 207 is ejected by an ejection roller 208. A sorter 220 encloses the ejected recording papers to each bin, thereby sorting the recording papers. The sorter 220 encloses the recording papers onto a top bin in the case where a sorting mode is not set. When a both-side recording mode is set, the recording paper is conveyed to the ejection roller 208. After that, the rotating direction of the ejection roller 208 is reversed, thereby guiding the paper to a re-feed conveying path by means of a flapper 209. When a multiple recording mode is set, the recording paper is guided to the re-feed conveying path by the flapper 209 so as not to be conveyed to the ejection roller 208. The recording paper guided to the re-feed conveying path is fed to the transfer unit 206 at the timing mentioned above.

Figure 3:
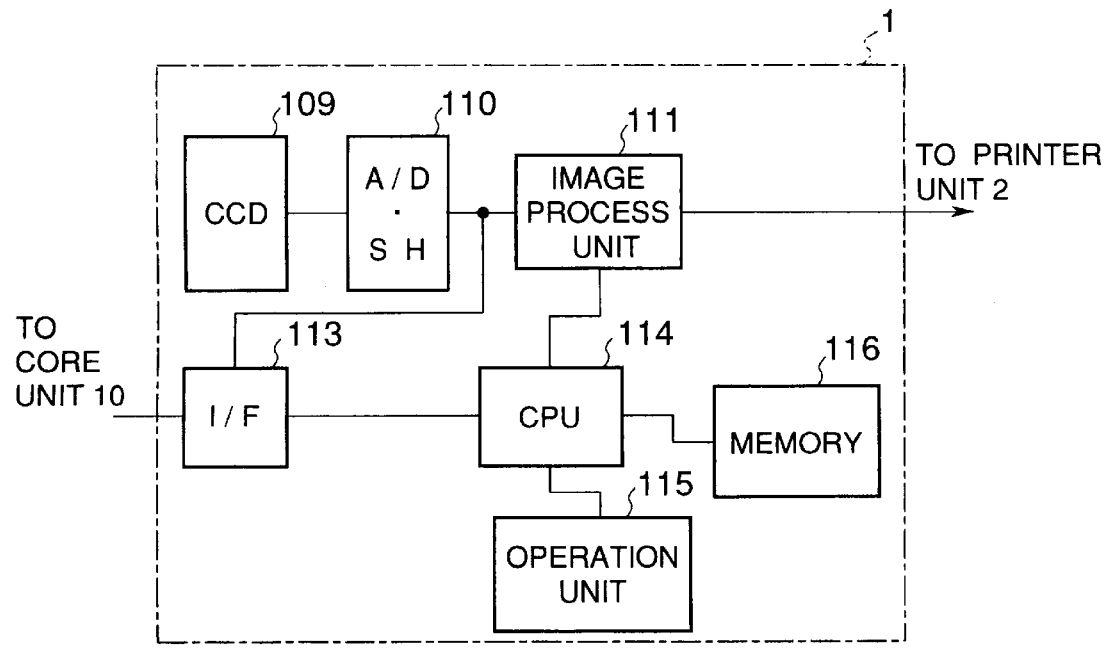
FIG. 3 is a block diagram showing a construction of an image processing system of the reader unit.

FIG. 3 is a block diagram of the reader unit 1. The image data outputted from the CCD 109 is analog/digital converted by an A/D·SH unit 110 and is subjected to a shading correction. The image data processed by the A/D·SH unit 110 is transferred to the printer unit 2 through an image process unit 111 and is also transferred to the core unit 10 of the image I/O control unit 3 through an interface unit 113. A CPU 114 controls the image processing unit 111 and interface unit 113 in accordance with set contents which were set by an operation unit 115. For example, when a copying mode in which a trimming process is performed by the operation unit 115 and a copying operation is executed is set, the trimming process is executed by the image process unit 111, thereby transferring the image data to the printer unit 2. When a facsimile transmitting mode is set by the operation unit 115, the image data and a control command according to the set mode are transferred from the interface unit 113 to the core unit 10. Such a control program of the CPU 114 is stored in a memory 116. The CPU 114 performs a control with reference to the memory 116. The memory 116 is also used as a work area of the CPU 114.

The operation unit 115 is constructed by a liquid crystal touch panel unit 115*a* for executing various kinds of operations and a liquid crystal display unit 115*b* for displaying the image data. The image data which was reduced by converting a resolution is displayed on the liquid crystal display unit 115*b* so as to display all of the image data of one picture plane (information of one original) within a range of the limited number of pixels of the liquid crystal display unit 115*b*.

Figure 4:
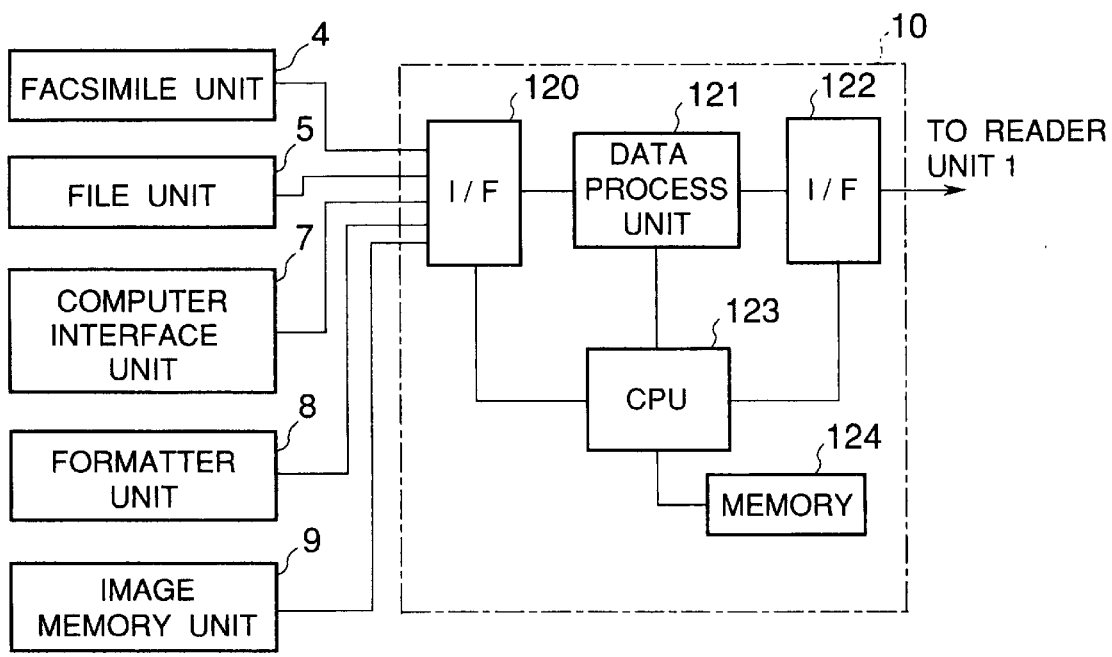
FIG. 4 is a block diagram showing a construction of a core unit.

FIG. 4 is a block diagram of the core unit 10. The image data from the reader unit 1 is transferred to a data process unit 121. The control command from the reader unit 1 is transferred to a CPU 123. The data process unit 121 executes image processes such as rotating process, variable magnifying process, and the like of the image. The image data transferred from the reader unit 1 to the data process unit 121 is transferred to the facsimile unit 4, file unit 5, and computer interface unit 7 through an interface 120 in accordance with the control command transferred from the reader unit 1. Code data indicative of the image inputted through the computer interface unit 7 is transferred to the data process unit 121 and, after that, it is transferred to the formatter unit 8 and is developed to the image data. The image data is transferred to the data process unit 121 and is, thereafter, transferred to the facsimile unit 4 and printer unit 2. The image data from the facsimile unit 4 is transferred to the data process unit 121 and is, thereafter, transferred to the printer unit 2, file unit 5, and computer interface unit 7. The image data from the file unit 5 is transferred to the data process unit 121 and is, thereafter, transferred to the printer unit 2, facsimile unit 4, and computer interface unit 7. The CPU 123 executes such a control in accordance with a control program stored in a memory 124 and the control command transferred from the reader unit 1. The memory 124 is also used as a work area of the CPU 123. As mentioned above, processes in which the functions such as reading of the original image, printing of the image, transmission and reception of the image, storage of the image, input and output of the data from the computer, and the like are compounded can be executed around the core unit 10 as a center.

Figure 5:
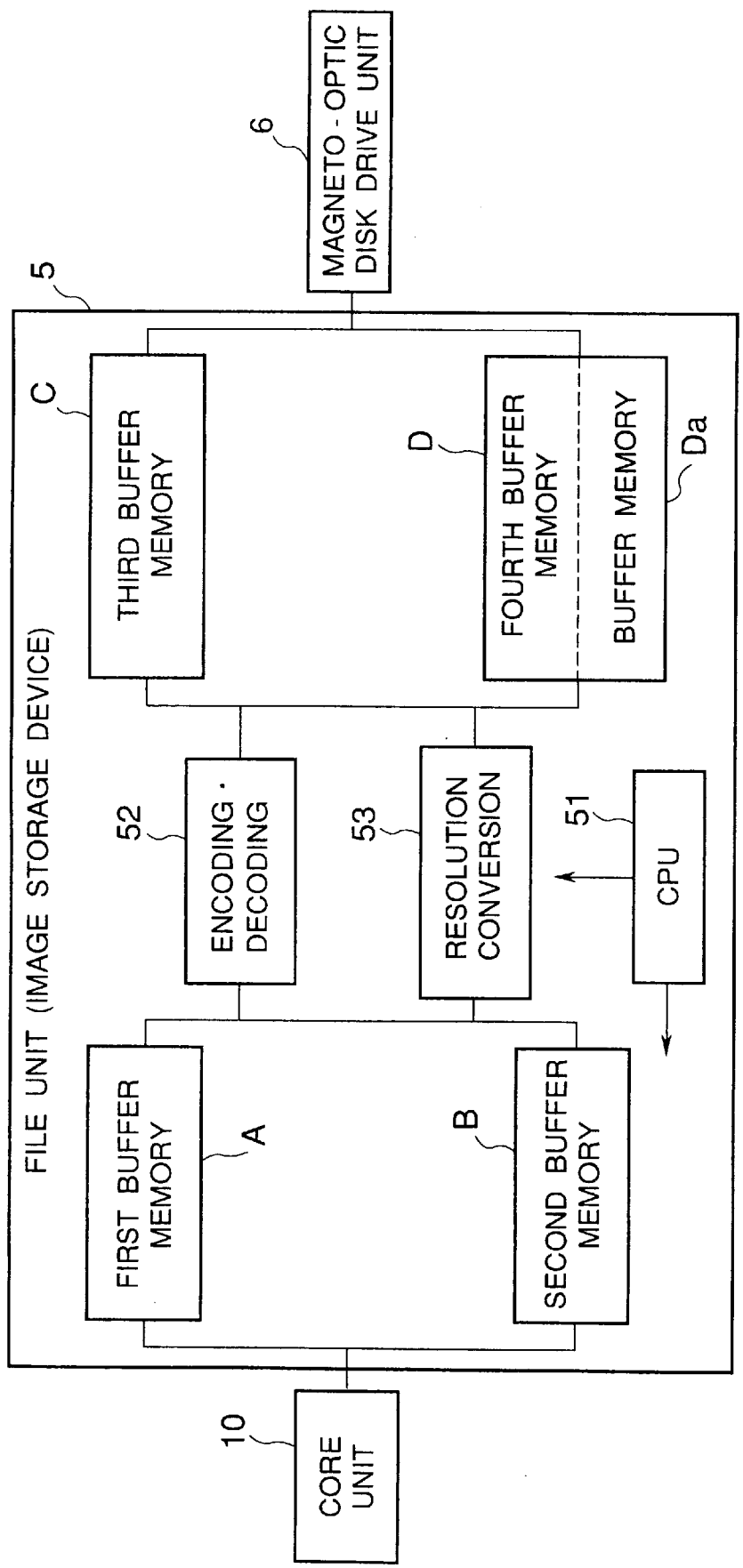
FIG. 5 is a block diagram showing a schematic construction of a file unit.

A construction of the file unit 5 will now be simply explained. As shown in FIG. 5, the file unit 5 has: a first buffer memory A and a second buffer memory B for storing image data and the like inputted from the core unit 10; a third buffer memory C for storing image data and the like encoded by an encoding/decoding circuit 52; and a fourth buffer memory D for storing image data whose resolution was converted by a resolution conversion circuit 53, image data in which the image data that had been resolution converted was further encoded by the encoding/decoding circuit 52, and the like. The image data stored in the third and fourth buffer memories C and D is transferred to the magneto-optic disk drive unit 6 under the control of a CPU 51.

A memory capacity of each of the first to fourth buffer memories A to D is set to 2 Mbytes in a manner such that the image data of an original of A4 size can be stored at a resolution of 400 dpi. An encoding/decoding process by the encoding/decoding circuit 52, a resolution converting process by the resolution conversion circuit 53, and a reading/writing process for the memory are executed under the control of the CPU 51.

A storing process of the image data in the file unit 5 will now be described.

First, a case where the image data of low resolution is not formed will be described.

In this case, the image data of high resolution of the first original which was inputted from the core unit 10 is stored into the first buffer memory A. The image data of high resolution stored in the first buffer memory A is compressed by being encoded by the encoding/decoding circuit 52 and is stored into the third buffer memory C. The encoded data stored in the third buffer memory C is transferred to the magneto-optic disk drive unit 6.

Figure 6:
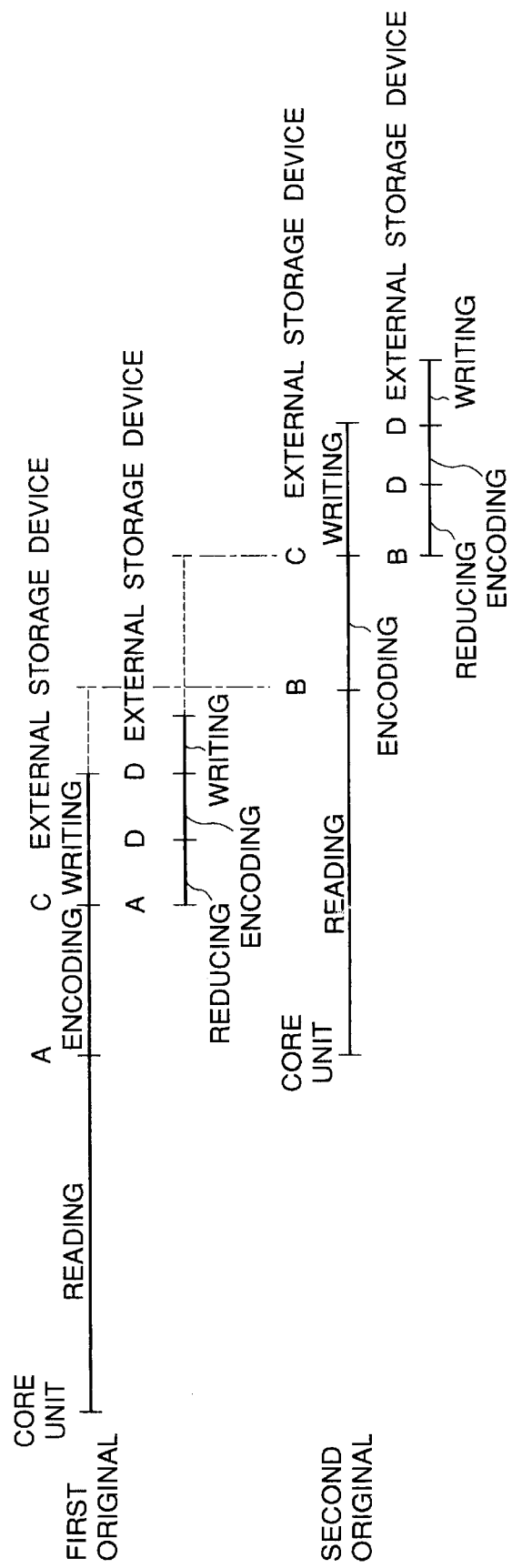
FIG. 6 is a timing chart showing the recording operation of the file unit.

As shown in FIG. 6, the reading of the image of the second original is started at a time point when the reading operation of the image of the first original is finished. The image data of the high resolution of the second original is immediately stored into the second buffer memory B through the core unit 10. After the image data in the first buffer memory A was compressed, the image data of the high resolution stored in the second buffer memory B is compressed by being encoded by the encoding/decoding circuit 52 and is stored into the fourth buffer memory D. The encoded data stored in the fourth buffer memory D is transferred to the magneto-optic disk drive unit 6.

In the case where the image data of low resolution is not formed, by repeating the above sequence, the image data of high resolution of the third and subsequent originals is also sequentially transferred to the magneto-optic disk drive unit 6. At this time, by using the first and second buffer memories A and B as double buffers of the input image data and by using the third and fourth buffer memories C and D as double buffers of the encoded data, a series of filing processes for the image data of the high resolution of the second original are partially processed in parallel. Therefore, the image data of high resolution of a plurality of originals can be promptly recorded onto the magneto-optical disk.

The recording operation in the case of recording the image data of high resolution and the image data of low resolution onto the magneto-optic disk will now be described with reference to FIG. 6.

In a manner similar to the case where the image data of the low resolution is not formed, the image data of the high resolution of the first original inputted from the core unit 10 is stored into the first buffer memory A. The image data of the high resolution stored in the first buffer memory A is compressed by being encoded by the encoding/decoding circuit 52 and is stored into the third buffer memory C. The encoded data stored in the third buffer memory C is transferred to the magneto-optic disk drive unit 6.

In this instance, as shown in FIG. 6, the image data of high resolution stored in the first buffer memory A is accessed by the resolution conversion circuit 53 at a time point when the encoding process by the encoding/decoding circuit 52 is finished. Namely, for a period of time during which the encoded data in the third buffer memory C is transferred to the magneto-optic disk drive unit 6 and is recorded onto the magneto-optic disk, the image data of high resolution stored in the first buffer memory A is converted by the resolution conversion circuit 53 to data of a predetermined low resolution such that all of the image data can be displayed on to the liquid crystal display unit 115b, and is stored into the fourth buffer memory D.

The image data of the low resolution stored in fourth buffer memory D is compressed by being encoded by the encoding/decoding circuit 52 and is stored into a buffer memory Da in the same memory block as the fourth buffer memory D. The buffer memory Da exists in an area in which a proper offset address is added to the fourth buffer memory D. Just after completion of the process in which the encoded data of the image data of the high resolution is recorded to into the magneto-optic disk, the encoded data of the low resolution stored in the buffer memory Da is transferred to the magneto-optic disk drive unit 6.

The reading operation of the image of the second original is started at a time point when the reading operation of the image of the first original is finished. The image data of high resolution of the second original is immediately written into the second buffer memory B through the core unit 10 and is processed in a manner similar to the first original. The image data of high resolution and the image data of low resolution are sequentially transferred to the magneto-optic disk drive unit 6.

By repeating the above-mentioned sequence, the image data of high resolution and the image data of low resolution of the third and subsequent originals are also sequentially transferred to the magneto-optic disk drive unit 6.

So long as a processing timing such that the image data of low resolution can be transferred to the magneto-optic disk drive unit 6 just after the end of the recording of the image data of high resolution can be assured, a timing to start the formation of the image data of low resolution by accessing the image data of high resolution stored in the first buffer memory A can be set to an arbitrary timing. For example, a reducing process can be also executed concurrently with the encoding of the high resolution data of the first original.

In the case where the image data of high resolution recorded on the magneto-optic disk and the image data of low resolution are outputted through the core unit 10 and the image data of high resolution is subjected to a facsimile transmission or the like or the image data of the low resolution is displayed by the liquid crystal display unit 115b, it is sufficient to execute the reading and decoding processes similarly by a sequence opposite to that mentioned above by effectively using the first to fourth buffer memories A to D. In this case, there is no need to execute the resolution converting process.

The present invention is not limited to the foregoing embodiments, but many modifications and variations are possible within the spirit and scope of the appended claims of the invention.

What is claimed is:

1. A control method of an image filing apparatus comprising the steps of:
    a) inputting image data and storing the inputted image data into a first buffer memory;
    b) causing an encoder to encode the image data stored in said first buffer memory and storing the encoded data into a second buffer memory;
    c) causing an external memory medium to store the encoded data stored in said second buffer memory;
    d) reducing said inputted image data;
    e) causing said encoder to encode said reduced image data after the encoding in said step b has been finished and storing into a third buffer memory; and
    f) causing said external memory medium to store the encoded data stored in said third buffer memory,
    wherein execution start timings of said steps d and e are controlled so that the encoded data stored in said third buffer memory is stored into said external memory medium just after the end of the storage of the encoded data stored in said second buffer memory.

2. A method according to claim 1, wherein said step d is executed after the end of said step b.

3. A method according to claim 1, wherein said step d is executed concurrently with said step b.

4. A method according to claim 1, further having the step of inputting next image data and storing into a fourth buffer memory just after the end of the input of the image data in said step a, and
    wherein said steps b to f are repeated for said next image data.

5. A method according to claim 1, further having the steps of:
    reading out the reduced image data stored in said external memory medium; and
    displaying the read-out image data to display means of a low resolution.

6. A control apparatus of an image filing apparatus, comprising:
    input means for inputting an image;
    first to third buffer memories;

encoding means for encoding image data;

resolution converting means for reducing a resolution of the image data;

storing means for storing the image data to an external memory medium; and control means for controlling in a manner such that the image data inputted by said input means is stored into said first buffer memory, the image data stored in said first buffer memory is encoded by said encoding means, the encoded data is stored into said second buffer memory, the encoded data stored in said second buffer memory is stored into said external memory medium by said storing means, further, the resolution of said inputted image data is reduced by said resolution converting means, the image data of the low resolution is encoded by said encoding means after the image data stored in said first buffer memory is encoded, the encoded data is stored into said third buffer memory is stored into said external memory medium by said storing means, wherein said control means controls operation start timings of said resolution converting means and said encoding means in a manner such that the encoded data stored in said third buffer memory is stored just after the encoded data stored in said second buffer memory was stored in said external memory medium.

7. An apparatus according to claim 6, wherein said control means makes said resolution converting means operative just after the end of the encoding of said input image data.

8. An apparatus according to claim 6, wherein said control means makes said resolution converting means operative in parallel with the encoding of said input image data.

9. An apparatus according to claim 6, further having:

decoding means for decoding the encoded data of the low resolution which is read out from said external memory medium; and display means of a low resolution for displaying the image data of the low resolution which was decoded by said decoding means.

10. A control method for an image filling apparatus, comprising the steps of:

a) inputting image data and storing the inputted image data into a first buffer memory;

b) causing an encoder to encode the image data stored in the first buffer memory and storing the encoded data into a second buffer memory;

c) causing an image memory medium to store the encoded data stored in the second buffer memory;

d) reducing the inputted image data;

e) causing the encoder to encode the reduced image data after the encoding in said step b has been finished and storing into a third buffer memory; and f) causing the image memory medium to store the encoded data stored in the third buffer memory, wherein execution start timings of said steps d and e are controlled so that said step e is executed concurrently with said step c.

11. A method according to claim 10, wherein said step d is executed after the end of said step b.

12. A method according to claim 10, wherein said step d is executed concurrently with said step b.

13. A method according to claim 10, further comprising the step of inputting next image data and storing into a fourth buffer memory just after the end of the input of the image data in said step a, and wherein said steps b to f are repeated for the next image data.

14. A method according to claim 10, further comprising the steps of:

reading out the reduced image data stored in the image memory medium; and displaying the read-out image data to display means of a low resolution.

15. A control apparatus for an image filing apparatus, comprising:

input means for inputting an image;

first to third buffer memories;

encoding means for encoding image data;

resolution converting means for reducing a resolution of the image data;

storing means for storing the image data to an image memory medium; and control means for controlling in a manner such that the image data inputted by said input means is stored into said first buffer memory, the image data stored in said first buffer memory is encoded by said encoding means, the encoded data is stored into said second buffer memory, the encoded data stored in said second buffer memory is stored into said image memory medium by said storing means, further, the resolution of said inputted image data is reduced by said resolution converting means, the image data of the low resolution is encoded by said encoding means after the image data stored in said first buffer memory is encoded, the encoded data is stored into said third buffer memory, and the encoded data stored in said third buffer memory is stored into said image memory medium by said storing means, wherein said control means controls operation start timings of said resolution converting means and said encoding means in a manner such that encoding of the image data of the low resolution is executed concurrently with storing of the encoded data stored in said second buffer memory into said image memory medium.

16. An apparatus according to claim 15, wherein said control means makes said resolution converting means operative just after the end of the encoding of said input image data.

17. An apparatus according to claim 15, wherein said control means makes said resolution converting means operative in parallel with the encoding of said input image data.

18. An apparatus according to claim 15, further comprising:

decoding means for decoding the encoded data of the low resolution which is read out from said image memory medium; and display means of a low resolution for displaying the image data of the low resolution which was decoded by said decoding means.

* * * * *

UNITED STATES PATENT AND TRADEMARK OFFICE
CERTIFICATE OF CORRECTION

PATENT NO. : 5,867,614

DATED : February 2, 1999

INVENTOR(S) : HIROHIKO ITO

It is certified that error appears in the above-identified patent and that said Letters Patent is hereby corrected as shown below:

COLUMN 2

Line 46, "hereinlater," should read --hereinafter,--.

COLUMN 3

Line 5, "on to" should read --onto--.

COLUMN 5

Line 40, "to" should be deleted.
Line 42, "the" should be deleted and "fourth" should read --the fourth--.
Line 51, "to" should be deleted.

UNITED STATES PATENT AND TRADEMARK OFFICE
CERTIFICATE OF CORRECTION

PATENT NO. : 5,867,614

DATED : February 2, 1999

INVENTOR(S) : HIROHIKO ITO

It is certified that error appears in the above-identified patent and that said Letters Patent is hereby corrected as shown below:

<u>COLUMN 7</u>

Line 18, "is stored into" should read --stored in--.
Line 41, "filling" should read --filing--.

Signed and Sealed this

Thirtieth Day of November, 1999

Attest:

Q. TODD DICKINSON

Attesting Officer

Acting Commissioner of Patents and Trademarks